United States Patent [19]

Cavitt

[11] 3,856,826

[45] Dec. 24, 1974

[54] PROCESS FOR OXIDIZING OLEFINS USING HYDROCARBON SOLUBLE PHOSPHORUS MODIFIED MOLYBDENUM CATALYSTS

[75] Inventor: Stanley Bruce Cavitt, Austin, Tex.

[73] Assignee: Jefferson Chemical Company, Inc., Houston, Tex.

[22] Filed: July 26, 1973

[21] Appl. No.: 382,918

Related U.S. Application Data

[62] Division of Ser. No. 102,138, Dec. 28, 1970, Pat. No. 3,784,482.

[52] U.S. Cl. .................................... 260/348.5 V
[51] Int. Cl. ............................................. C07d 1/08
[58] Field of Search ........................... 260/348.5 V

[56] References Cited
FOREIGN PATENTS OR APPLICATIONS
1,550,166   11/1968   France
   44-9651    5/1969   Japan Primary Examiner—Norma S. Milestone
Attorney, Agent, or Firm—James L. Bailey; John R. Kirk, Jr.

[57] ABSTRACT

Stable, homogeneous phosphorus-modified molybdenum catalysts are prepared by incorporating phosphorus ligands into molybdenum compounds. The molybdenum compounds are prepared by reacting an ammonia-containing molybdate with a hydroxy compound, for example, an organic primary or secondary alcohol, a glycol or a phenol. The hydrocarbon-soluble phosphorus-modified molybdenum solutions are useful as homogeneous oxidation catalysts, particularly for the oxidation of olefins to olefin oxides. Olefin oxides are useful in the manufacture of non-toxic antifreeze, urethane-grade polyols and many other applications. The catalysts of the invention may also be used as metal-plating solutions, lubricant additives, pigments, ammoxidation catalysts, printing inks, or solution components for organic laser devices. They may also be used as catalysts or co-catalysts for various polymerization processes, such as homopolymerization of isocyanates, isocyanate-polyol reactions, or olefin oxide polymerization reactions.

5 Claims, No Drawings

PROCESS FOR OXIDIZING OLEFINS USING HYDROCARBON SOLUBLE PHOSPHORUS MODIFIED MOLYBDENUM CATALYSTS

CROSS REFERENCE TO RELATED APPLICATION

This is a division, of application Ser. No. 102,138, filed Dec. 28, 1970 and now U.S. Pat. No. 3,784,482.

My co-pending application entitled "Hydrocarbon Soluble Molybdenum Catalysts," Ser. No. 102,227, filed of even date with the aforesaid application Ser. No. 102,138 teaches the synthesis of hydrocarbon-soluble molybdenum catalysts prepared by reacting an ammonia-containing molybdate with a hydroxy compound. The compounds of my copending application are incorporated with phosphorus ligands to prepare the catalysts of this invention.

BACKGROUND OF THE INVENTION

1. Field of the Invention

The invention pertains to the chemical field and the synthesis and use of molybdenum catalysts containing phosphorus ligands.

2. Description of the Prior Art

Giovanni A. Bonetti's and Rudolph Rosenthal's U.S. Pat. No. 3,480,563 (Nov. 25, 1969) discloses organic-soluble molybdenum compounds derived from a direct reaction between molybdic oxide and an alcohol. These compounds are used as catalysts in the epoxidation of olefinic compounds wherein an organic hydroperoxide is used as the oxidizing agent.

SUMMARY OF THE INVENTION

Phosphorus-molybdenum-hydroxy compound catalysts are prepared with phosphorus compounds capable of reacting with hydroxy compounds. The phosphorus-modified molybdenum catalysts are synthesized by incorporating the phosphorus ligand with an ammonia-containing molybdate and a hydroxy compound, for example, an organic primary or secondary alcohol, a glycol or a phenol. These phosphorus-modified molybdenum catalysts of the invention can be preoxidized for better effectiveness as epoxidation catalysts. The invention includes the catalysts prepared by this process and the use of the catalysts for the oxidation of olefins to olefin oxides.

DESCRIPTION OF THE PREFERRED EMBODIMENTS

The invention relates to the synthesis of phosphorus-modified molybdenum catalysts. To prepare the catalysts, phosphorus ligands are reacted with an ammonia-containing molybdate and a hydroxy compound. It is preferred to react the phosphorus ligand with hydrocarbon-soluble molybdenum compounds prepared by heating an ammonia-containing molybdate with a hydroxy compound, for example, organic primary or secondary alcohols or a glycol containing 30 to 30 carbon atoms, or a phenol to a temperature which dissolves the basic molybdenum compound. Any type of phosphorus-containing compound capable of reacting with hydroxy compounds under reasonable conditions are useful in the synthesis of the catalysts of the invention. Examples of suitable phosphorus compounds are organic phosphites, phosphates, and phosphines, phosphorus pentoxide, phosphorus trichloride, phosphorus pentasulfide, phosphorus oxychloride, phosphorus sulfochloride, phosphoric acid and phosphorous acid. The phosphorus catalysts can be preoxidized for better effectiveness as epoxidation catalysts.

Conditions necessary to react the phosphorus compounds may range from about room temperature to several hundred degrees and from about 15 minutes to as much as 10 hours.

The following examples illustrate my invention in more detail but are not intended to limit the scope of the invention. Examples 1–5 illustrate the synthesis of several catalysts of the invention. Examples 6 and 7 illustrate the preparation of an olefin oxide using the catalysts of the invention.

EXAMPLE 1

Preparation of Phosphorus — Molybdenum — Decyl Alcohol Catalyst

To a 500 ml. distilling flask equipped with a magnetic stirring bar, thermometer, and foam trap were added 100 g. of about 5% molybdenum (as a molybdic acid — decyl alcohol reaction product) and 14 g. of granular phosphorus pentoxide. The mixture was heated under aspirator vacuum (air-bleed regulated) at about 150°C. until all of the solid dissolved. Then 100 g. of decyl alcohol was added (the solution changed from green to brown color) and the flask and contents were reheated to 140°–150°C. for one hour with slow removal of water and lights and alcohol (solution color changed back to green). Most of the excess alcohol was then removed under full aspirator vacuum, after which the liquid concentrate was heated on a water bath (100°C.) under full pump vacuum using a rotary evaporator to remove the remainder of the alcohol. There was recovered 88 g. of a viscous, green solution; no solid residues were observed. The 88 g. of green concentrate was then diluted with 500 ml. of chlorobenzene and oxidized in a stream of oxygen for one-half hour at 130°C. The solution remained green throughout the oxidation period; no residues were formed. After concentrating the oxidized molybdenum solution on a steam bath under aspirator vacuum, there was obtained 225 g. of dark, yellow-green solution which contained 1.4 wt. % molybdenum and had a phosphorus/-molybdenum g. — atom weight ratio of about 5.25/1.

EXAMPLE 2

Preparation of Phosphorus — Molybdenum — Isononyl Alcohol Catalysts

To a 500 ml. distilling flask equipped with a magnetic stirring bar, thermometer, and foam trap were added 100 g. of 4% molybdenum (as a molybdic acid - isononyl alcohol reaction product) and 3.0 g. of granular phosphorus pentoxide. The mixture was heated under aspirator vacuum at reflux temperature until the solid dissolved and all lights were removed, then most of the excess alcohol was removed. The concentrated solution was then transferred to a rotary evaporator and heated on a water bath under full pump vacuum until all excess alcohol was removed. The 28 g. of liquid concentrate obtained was then diluted with 500 ml. of chlorobenzene and oxidized under the usual conditions for one hour, giving a very deep turquoise-blue solution. After concentrating on a steam bath under aspirator vacuum, there was obtained 239 g. of blue-green solution containing 1.6 wt. % molybdenum.

EXAMPLE 3

Preparation of Phosphorus — Molybdenum — Isononyl Alcohol Catalyst

This experiment was performed in the same manner as example 2, except that a fresh batch of molybdic acidisonyl alcohol reaction product was employed along with 6.0 g. of phosphorus pentoxide. After workup, the 37 g. of concentrated solution obtained was diluted with chlorobenzene and oxidized by the usual procedure to give, after workup, a very deep blue solution containing 2.0 wt. % molybdenum. This solution was further concentrated to give a slightly viscous, deep-blue solution containing about 10% molybdenum. The phosphorus-modified molybdenum catalysts of my invention useful in oxidation of olefins can be preoxidized in the presence or absence of alcohol used in the catalyst synthesis.

EXAMPLE 4

Preparation of Phosphorus — Molybdenum — 2-Ethyl-1,3-Hexylene Glycol Catalyst

This experiment was performed in the same manner as example 2, except 50 g. of 6.3 wt. % molybdenum (as a molybdic acid 2-ethyl-1,3-hexanediol reaction product) and 4.6 g. of phosphorus pentoxide were employed. The final oxidized solution (111 g.) was a deep blue color and contained about 2.7 wt. % molybdenum.

EXAMPLE 5

Preparation of Phosphorus — Molybdenum — Isononyl Alcohol Catalyst

This experiment was performed in the same manner as example 2, except 100 g. of 4% molybdenum (as a molybdic acid - isononyl alcohol reaction product) and 9.0 g. of phosphorus pentoxide were employed. The final oxidized solution was an emerald green color, weighed 100 g., and contained about 3.5 wt. % molybdenum.

EXAMPLE 6

Oxidation of Propylene to Propylene Oxide Using A Phosphorus-Containing Molybdic Acid-n-Decanol Reaction Product The apparatus used for this oxidation experiment was a stirred, ceramic-lined, 500 ml. autoclave. Chlorobenzene solvent containing 28.5 ppm. molybdenum (as a phosphorus-containing, oxidized molybdic acid-n-decanol reaction product) was premixed with oxygen and fed into the autoclave at two points: a connection, bottom center, where this feed was mixed with propylene, and a dip tube extending about half-way to the bottom of the autoclave. The autoclave was fitted with a cooling coil to provide close temperature control, and was equipped with a mechanical stirrer with three sets of propellers on the shaft. A product withdrawal tube at the top of the autoclave allowed the product to exit to a cooling coil and then through a back-pressure regulator to a gas-liquid separator where the off-gas was metered and sampled and the liquid product was retained for weighing and sampling. The solvent-filled reactor was heated to reaction temperature (250°C.) and propylene was fed to the reactor for 10–15 minutes before the oxygen was turned on. After the initial exotherm, about ½ to 1 hour prerun, a steady state was achieved, the product was collected, and the off-gas was sampled. The feed rates for the reaction were as follows: chlorobenzene, 45.8 lbs./hr.; propylene, 8.8 lbs./hr.; oxygen, 564 g./hr. The holding time was 1.2 minutes.

The yield of propylene oxide by chromatography, allowing for residues formed, was 48 mol % and the conversion based on propylene was 13 mol %. The residues/oxide wt. ratio was 0.34 and the oxide/acids wt. ratio was 6.5. The soluble molybdenum recovery was 97% of theory.

EXAMPLE 7

Oxidation of Propylene to Propylene Oxide Using A Phosphorus-Containing Molybdic Acid - Tetrahydrofurfuryl Alcohol Reaction Product The apparatus used for this oxidation experiment was a stirred, ceramic-lined, 500 ml. autoclave. Chlorobenzene solvent containing 26.8 ppm molybdenum (as a phosphorus-containing, oxidized molybdic acid-tetrahydrofurfuryl alcohol reaction product) was premixed with oxygen and fed into the autoclave at two points: a connection, bottom center, where this feed was mixed with propylene, and a dip tube extending about half-way to the bottom of the autoclave. The autoclave was fitted with a cooling coil to provide close temperature control, and was equipped with a mechanical stirrer with three sets of propellers on the shaft. A product withdrawal tube at the top of the autoclave allowed the product to exit to a cooling coil and then through a back-pressure regulator to a gas-liquid separator where the off-gas was metered and sampled and the liquid product was retained for weighing and sampling. The solvent-filled reactor was heated to reaction temperature (230°C.) and propylene was fed to the reactor for 10–15 minutes before the oxygen was turned on. After the initial exotherm, about ½ to 1 hour prerun, a steady state was achieved, the product was collected, and the off-gas was sampled. The feed rates for the reaction were as follows: chlorobenzene, 45.2 lbs./hr.; propylene, 8.44 lbs./hr.; oxygen, 564 g./hr. The holding time was 1.2 minutes. The yield of propylene oxide by chromatography allowing for residues formed, was 59 mol % and the conversion based on propylene was 12 mol %. The residues/oxide wt. ratio was 0.16, and the oxide/acids wt. ratio was 48/1. The soluble molybdenum recovery was 86.5% of theory.

Effective amounts of catalyst for the oxidation of olefins to olefin oxides range from about 5 to 1,000 parts per million (ppm) based on the total feedstock. Preferred ranges are between 10 and 100 ppm.

The hydrocarbon-soluble phosphorus-modified molybdenum solutions of the invention are useful as homogeneous oxidation catalysts, particularly for the oxidation of olefins to olefin oxides. They are also of value as metal plating solutions, lubricant additives, ammoxidation catalysts, printing inks, pigments, or solution components for organic laser devices. The compounds of the invention may be used as catalysts or co-catalysts for various polymerization processes such as homopolymerization of isocyanates, isocyanate-polyol reactions or olefin oxide polymerization reactions. Olefin oxides are useful in the manufacture of non-toxic antifreeze, urethane-grade polyols and many other applications.

Any temperature and time combination can be used to prepare the catalysts of the invention which will result in dissolution of the basic molybdenum compound. The preferred conditions are temperatures of about 100° to 200°C. and reaction times of about 1 to 4 hours.

Examples of the ammonia-containing molybdates useful in the invention are ammonium paramolybdate or "85% molybdic acid" which contains about 85% paramolybdate.

The hydroxy compounds useful in the synthesis of catalysts of the invention are, for example, primary or secondary alcohols or glycols containing 3 to 30 carbon atoms, or phenols. The alcohols may contain olefinic groups or saturated ether groups. The alcohols may be pure compounds or mixtures of isomers. Mixtures of isomers, particularly those of highly branched or iso alcohols, are usually preferred. The alcohols include primary and secondary linear, branched, alicyclic, aliphatic, and arylaliphatic alcohols, including those with unsaturated olefinic groups or cyclic or aliphatic ether groups. Further examples of hydroxy compounds useful in the synthesis of catalysts of the invention are 5-norbornene-2-methanol, 2,2,4-trimethyl-1,3-pentanediol, nonyl phenol, 3,5,5-trimethyl-1-hexanol, methoxyethanol, 1,3-propylene glycol and 1,2-propylene glycol.

Gram-atom weight ratios of phosphorus to molybdenum can range from 0.25:1 to 30:1.

Comparable results to those in the examples, supra, are obtained in synthesizing other catalysts of the invention and in the synthesis of olefin oxides from olefins, for example ethylene, propylene, butylene or isobutylene or higher olefins, using the catalysts of my invention.

Having thus described my invention,
I claim:

1. In a liquid phase process for oxidizing olefins to olefin oxides whereby the olefin is heated with oxygen in the presence of an oxidation catalyst and an organic solvent in liquid phase at a temperature sufficient to promote the oxidation reaction, the improvement which comprises oxidizing the olefin in the presence of an effective amount of a hydrocarbon-soluble phosphorus molybdenum-hydroxy compound catalyst prepared by heating a phosphorus compound (A) with ammonium molybdate (B) and a hydroxy compound (C) containing from 3 to 30 carbon atoms per molecule selected from the group consisting of an organic hydrocarbon primary alcohol, organic hydrocarbon secondary alcohol, a phenol and an aliphatic hydrocarbyl glycol to a temperature which dissolves said ammonium molybdate (B) wherein said phosphorus compound (A) is one capable of reacting under said conditions with said hydroxy compound (C) selected from the group consisting of phosphorus pentoxide, phosphorus trichloride, phosphorus pentasulfide, phosphorus oxychloride, phosphorus sulfochloride, phosphoric acid and phosphorous acid and wherein the hydroxy concentration of (C) is in excess of the molybdate concentration of (B) and wherein the gram-atom weight ratio of phosphorus of said phosphorus compound (A) to molybdenum of said ammonium molybdate (B) is in the range from .25:1 to 30:1.

2. A process according to claim 1 wherein the phosphorus-molybdenum-hydroxy compound product is preoxidized by refluxing said product in the presence of oxygen before it is used to oxidize the olefin.

3. A process according to claim 1 wherein the phosphorus compound (A) is phosphorus pentoxide.

4. A process according to claim 1 wherein the olefin is propylene.

5. A process according to claim 1 wherein the hydrocarbon-soluble phosphorus-molybdenum-hydroxy compound catalyst is present in an amount from about 5 to 1,000 parts per million based on the total olefin feedstock.

* * * * *